United States Patent
Siddiqi et al.

(10) Patent No.: US 7,729,314 B2
(45) Date of Patent: Jun. 1, 2010

(54) METHOD FOR SUPPORTING MOBILITY FOR DYNAMIC WINDOWS CLIENTS IN A WIRELESS LAN NETWORK

(75) Inventors: Waseem Siddiqi, Sunnyvale, CA (US); Bruce A. McMurdo, San Jose, CA (US); Kent K. Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 11/258,470

(22) Filed: Oct. 24, 2005

(65) Prior Publication Data

US 2007/0091842 A1    Apr. 26, 2007

(51) Int. Cl.
*H04W 4/00* (2009.01)
(52) U.S. Cl. ............... 370/331; 370/310.2; 370/338; 370/393; 370/400; 370/401; 455/414.1; 455/414.2; 455/418; 455/432.1; 455/432.3; 455/436; 709/210; 709/217; 709/230; 709/245
(58) Field of Classification Search .............. 455/414.1, 455/414.2, 418, 432.1, 432.3, 436; 370/310.2, 370/331, 338, 393, 400, 401
See application file for complete search history.

(56) References Cited

U.S. PATENT DOCUMENTS

| | | | |
|---|---|---|---|
| 6,434,134 B1 * | 8/2002 | La Porta et al. ............. | 370/338 |
| 6,510,153 B1 | 1/2003 | Inoue et al. | |
| 6,701,361 B1 | 3/2004 | Meier et al. | |
| 6,950,628 B1 | 9/2005 | Meier et al. | |
| 7,000,012 B2 * | 2/2006 | Moore et al. ................. | 709/220 |
| 7,218,618 B2 * | 5/2007 | Greis et al. .................. | 370/328 |
| 7,269,173 B2 * | 9/2007 | Iyer et al. ............... | 370/395.31 |
| 2003/0045287 A1 * | 3/2003 | Taniguchi .................... | 455/433 |
| 2004/0203749 A1 * | 10/2004 | Iyer et al. ................. | 455/432.1 |
| 2005/0185626 A1 * | 8/2005 | Meier et al. ................. | 370/338 |

OTHER PUBLICATIONS

C. Perkins, "IP Mobility Support for IPv4," Network Working Group, Nokia Research, RFC 3344, Aug. 2002, pp. 1-90, http:I/www.faqs.org/rfcs/rfc3344.html.*
C. Perkins, "IP Mobility Support for IPv4," Network Working Group, Nokia Research, RFC 3344, Aug. 2002, pp. 1-90, http://www.faqs.org/rfcs/rfc3344.html.

(Continued)

*Primary Examiner*—Stephen M D'Agosta
(74) *Attorney, Agent, or Firm*—Weaver Austin Villeneuve & Sampson LLP (57) ABSTRACT

Methods and apparatus for preventing an IP address from being assigned to a client implementing a protocol such as DHCP are disclosed. This is particularly useful in an environment such as a Mobile IP environment in which a network device (e.g., Access Point) performs proxy registration on behalf of the client. When the client transmits a detection packet to detect whether its IP address is still valid (e.g., whether it is on the same sub-network on which the IP address was allocated), a response is transmitted to the client that indicates that the client is still on its home network. This response is transmitted regardless of whether the client is still on its home network. Since the client believes it is still on its home network, a new IP address will not be assigned to the client. As a result, an existing Mobile IP session will not be interrupted.

24 Claims, 6 Drawing Sheets

OTHER PUBLICATIONS

Wang et al., "Methods and Apparatus for Supporting Proxy Mobile IP Registration in a Wireless Local Area Network," U.S. Appl. No. 10/080,995, filed Feb. 20, 2002.

S. Deering, Editor, "ICMP Router Discovery Messages," Network Working Group, Xerox PARC, RFC 1256, Sep. 1991, pp. 1-15, http://www.faqs.org/rfcs/rfc1256.html.

R. Droms, "Dynamic Host Configuration Protocol," Network Working Group, Bucknell University, RFC 2131, Mar. 1997, pp. 1-35, http://www.faqs.org/rfcs/rfc2131.html.

International Search Report and Written Opinion mailed Dec. 26, 2007 from corresponding PCT Application No. PCT/US06/41513, 13 pages.

* cited by examiner

METHOD FOR SUPPORTING MOBILITY FOR DYNAMIC WINDOWS CLIENTS IN A WIRELESS LAN NETWORK

BACKGROUND OF THE INVENTION

The present invention relates to Mobile IP network technology. More particularly, the present invention relates to maintaining a Mobile IP session on clients running a protocol such as DHCP on a system such as the Microsoft Windows™ operating system Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

Figure 1:
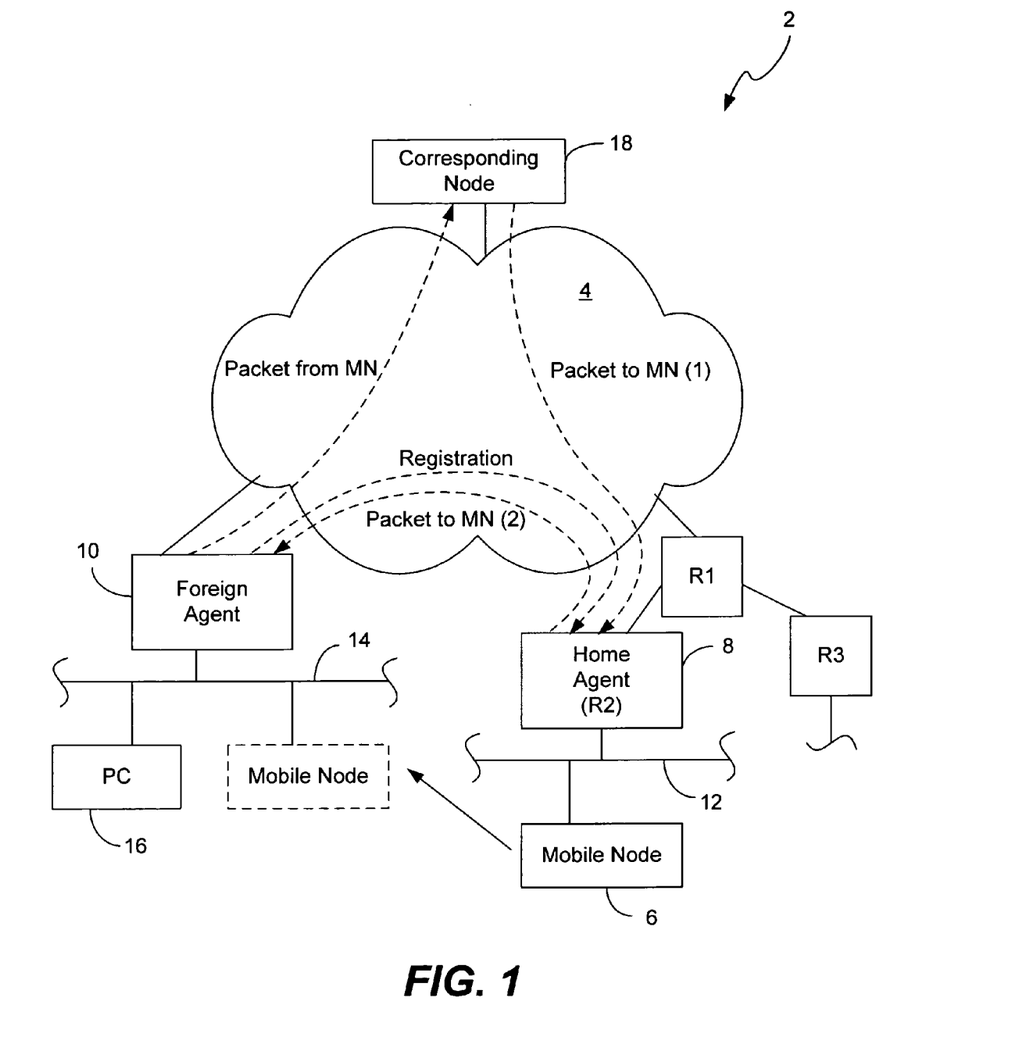
FIG. 1 is a diagram of a Mobile IP network segment and associated environment.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

Since a node may not support Mobile IP, a node that changes its location within a network cannot initiate registration with its Home Agent. Proxy mobile IP support (i.e., proxy registration) may therefore be performed by an Access Point on behalf of the node. An Access Point (AP) is the center point in an all-wireless network or serves as a connection point between a wired and a wireless network. Multiple APs can be placed throughout a facility to give users with WLAN adapters the ability to roam freely throughout an extended area while maintaining uninterrupted access to all network resources. Once a node is registered with a Home Agent, packets may be forwarded by the Home Agent to the Foreign Agent. Moreover, the AP may also redirect packets sent by the node to the Foreign Agent, enabling the redirected packets to be sent to the appropriate destination by the Foreign Agent. Application Ser. No. 10/080,995, entitled "METHODS AND APPARATUS FOR SUPPORTING PROXY MOBILE IP REGISTRATION IN A WIRELESS LOCAL AREA NETWORK," by inventors Wang et al, filed on Feb. 20, 2002, which discloses a method of supporting proxy registration by an Access Point, is incorporated by reference for all purposes.

In order to send a registration request on behalf of the node, the Access Point needs the node's IP address and Home Agent address (i.e., default gateway) in order to compose a registration request packet. In addition, the Access Point also ascertain's the node's sub-network network mask (i.e., netmask) in order to ascertain whether Mobile IP proxy services are required. Specifically, when the Access Point determines from the source address of a data packet and the netmask that the node is located on the subnet identical to the subnet of the Access Point, no Mobile IP service is required on behalf of the node as shown at block. However, when the Access Point determines from the source address that the node is not located on the subnet of the Access Point, proxy Mobile IP service is performed by the Access Point is performed on behalf of the node.

Thus, the Access Point acts as a proxy Mobile Node to register a client (i.e., node) with its Home Agent. Specifically, the Access Point identifies or allocates a Home Agent and sends a registration request to the Home Agent to establish a Mobile IP session on behalf of the client. The client receives packets addressed to its home address throughout the Mobile IP session. In this manner, a Mobile Node may roam while maintaining connectivity to the network.

Clients running the Microsoft Windows™ operating system currently include a feature termed the "media sense" feature. The media sense feature detects the "link state" of the network media. When this feature senses that the network media on which it is running has undergone a state change, then it will activate the Dynamic Host Configuration Protocol (DHCP) in order to obtain a new IP address. In a Wireless LAN mobile network, as a Microsoft™ client roams from a wireless Access Point to another wireless Access Point, the media sense feature is triggered, thus causing the dynamic host configuration protocol to get activated. When the dynamic host configuration protocol is activated, a new IP address on the new subnet is allocated to the client. As a result, the client cannot maintain its Mobile IP session, which is associated with its prior IP address.

In view of the above, it would be desirable if a Mobile IP session could be maintained on clients running a protocol such as DHCP on a system such as the Microsoft Windows™ operating system. More particularly, it would be beneficial if proxy Mobile IP could be supported on clients running a protocol such as DHCP on a system such as the Microsoft Windows™ operating system.

SUMMARY OF THE INVENTION

Methods and apparatus for preventing an IP address from being assigned to a client implementing a protocol such as DHCP on a system such as the Microsoft Windows™ operating system are disclosed. When the client transmits a detection packet to detect whether its IP address is still valid (e.g., whether it is on the same sub-network), a response is transmitted to the client that indicates that the client is still on its home network (e.g., the network on which its IP address has been allocated). This response is transmitted regardless of whether the client is still on its home network. Since the client believes it is still on its home network, a new IP address will not be assigned to the client. As a result, an existing Mobile IP session will not be interrupted.

In accordance with one embodiment, the disclosed embodiments may be applied in an environment in which mobility of a client is supported. For instance, the disclosed embodiments may be applied in an environment such as a Mobile IP environment in which a network device (e.g., Access Point) performs proxy registration on behalf of the client.

In accordance with one aspect of the invention, various detection messages may be transmitted by the client. For instance, a detection message may be sent to determine whether the client remains on its home network and therefore whether its IP address is still valid. In response to each detection message, a response message is transmitted by a device such as an Access Point, as appropriate. These detection messages may be transmitted individually, or consecutively in combination with other detection messages. For instance, if the client does not receive a response to a particular detection message within a particular period of time, the client may transmit another detection message.

In accordance with another aspect of the invention, a method of preventing a client from being assigned a new IP address includes receiving a detection message from the client. A response is then transmitted to the client, where the response indicates that the client is on a home network of the client regardless of whether the client is on the home network.

In accordance with one embodiment, the detection message that is received from the client is an Address Resolution Protocol (ARP) request and the response is an ARP reply. If the client does not receive the ARP reply, the client may transmit a second detection message, which will trigger the sending of a second response (e.g., by an Access Point) that indicates that the client is on the home network of the client regardless of whether the client is on the home network. For instance, the second detection message may be an Internet Control Message Protocol (ICMP) PING message (ECHO request), which triggers a PING response (ECHO reply).

In accordance with another embodiment, the second response (e.g., ICMP ECHO reply) is transmitted when it is determined that proxy Mobile IP is to respond to the second detection message (e.g., ICMP ECHO request). This decision is based upon various conditions. For instance, proxy Mobile IP may choose to transmit the second response when it has ascertained that proxy Mobile IP has been established (e.g., enabled). More specifically, proxy Mobile IP has been established when proxy registration has been completed. Thus, an Access Point receiving detection messages from the client may determine whether proxy Mobile EP is enabled prior to transmitting the second response.

In accordance with yet another embodiment, a network device such as an Access Point may prevent a client from being assigned a new IP address. The network device receives a DHCP request from the client and identifies a physical interface of the network device on which the DHCP request was received. A MAC address associated with the physical interface is provided as a source MAC address in the DHCP request. The DHCP request is then transmitted to the correct DHCP server.

In accordance with yet another embodiment, a network device such as an Access Point may prevent a client from being assigned a new IP address. The network device receives a DHCP discover from the client and identifies a physical interface of the network device on which the DHCP discover was received. A MAC address associated with the physical interface is provided as a source MAC address in the DHCP discover. The DHCP discover is then transmitted to a DHCP server.

In accordance with another aspect of the invention, the invention pertains to a system operable to perform and/or initiate any of the disclosed methods in a Home Agent, Access Point, or Mobile Node. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 3:
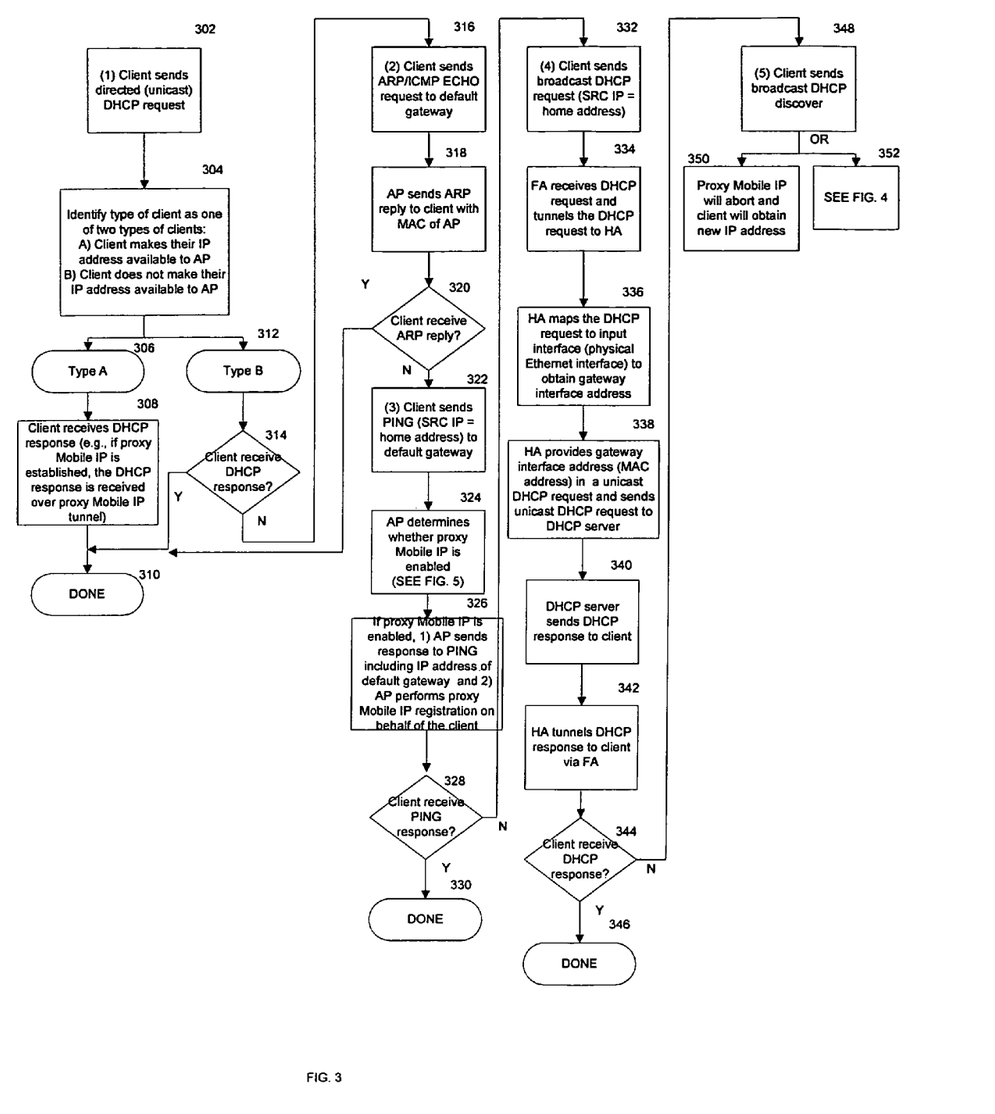
FIG. 3 is a process flow diagram illustrating a method of supporting mobility in a client implementing DHCP in accordance with one embodiment of the invention.
Figure 4:
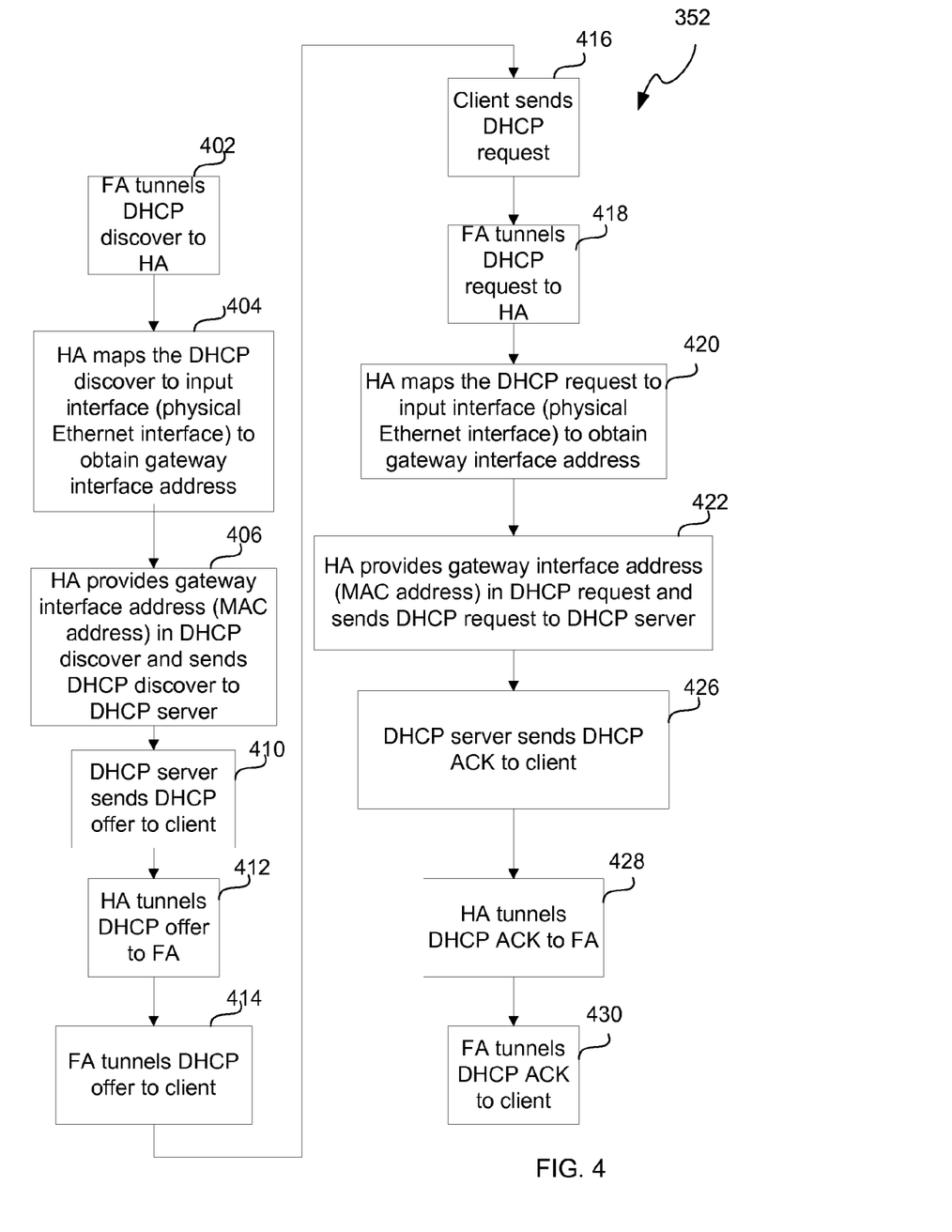
FIG. 4 is a process flow diagram illustrating a method of providing a response to a DHCP discover message as shown at block 352 of FIG. 3.
Figure 5:
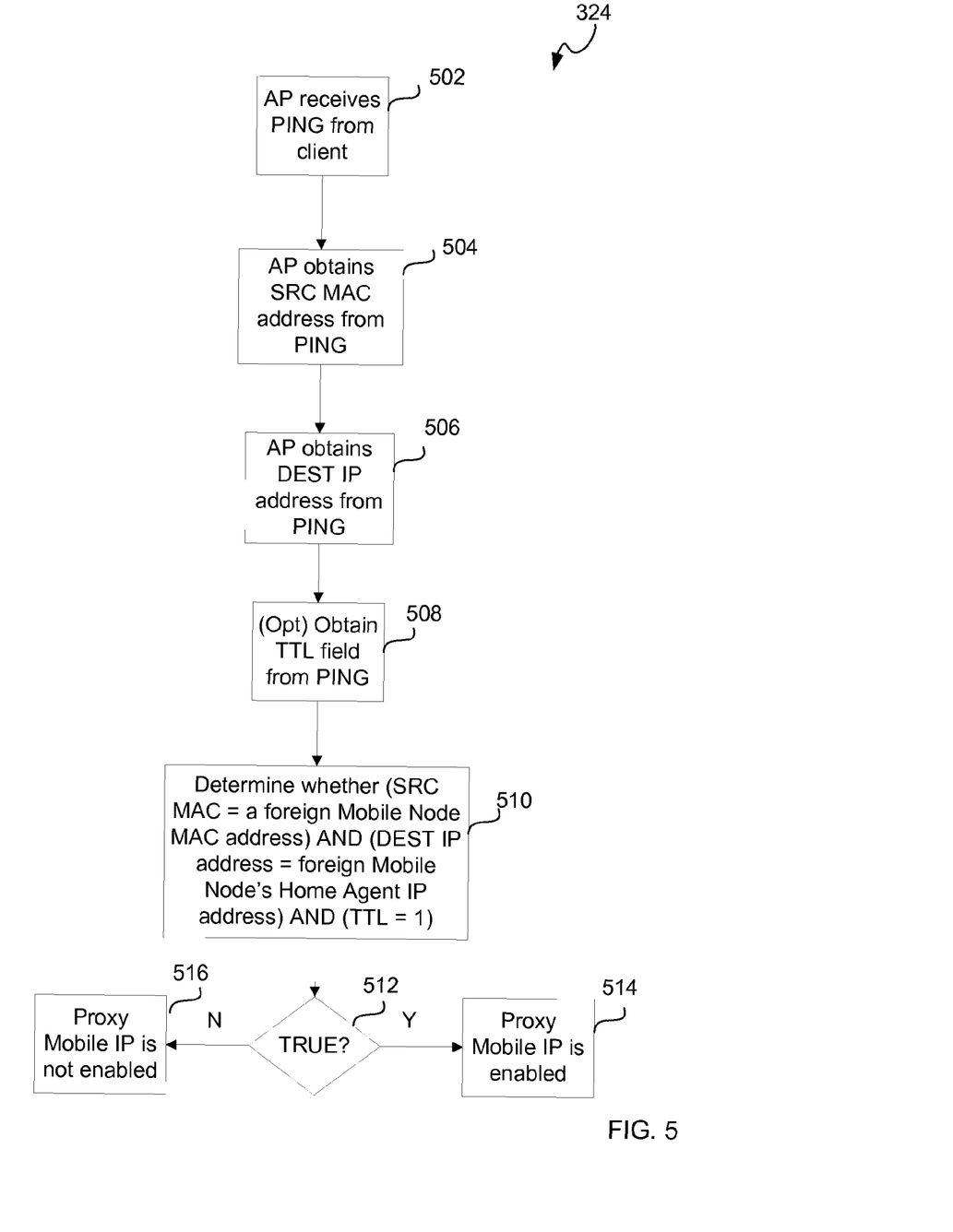
FIG. 5 is a process flow diagram illustrating a method of determining whether proxy Mobile IP will respond to a PING request in accordance with one embodiment of the invention.

In a client implementing a protocol such as DHCP, the client may attempt to confirm that its IP address is still valid. Alternatively, the client may ascertain whether it remains on the same subnet. This may be accomplished through a variety of mechanisms (e.g., messages). Moreover, these messages may be used separately or in combination with one another. For instance, the client may continue to try various mechanisms until it receives a response. Furthermore, these mechanisms may be used in any order. Thus, the description set forth below with reference to FIGS. 3-5 is merely illustrative of the mechanisms that may be applied by a client.

In response to a particular message transmitted by the client, a network device such as an access point may send a response to the client. Specifically, the network device may send a response indicating that the client remains on its home network (e.g., the network on which it's IP address has been allocated), regardless of whether the client is actually on its home network. Since the client will continue to believe it is on the same network, it will not obtain a new IP address. In this manner, a Mobile IP session may be maintained without any interruption.

For purposes of the following discussion, the term "mobile node" will be used to refer to a mobile node implementing the Mobile IP protocol, while the term "node" will be used to refer to a node that does not implement the Mobile IP protocol.

Figure 2:
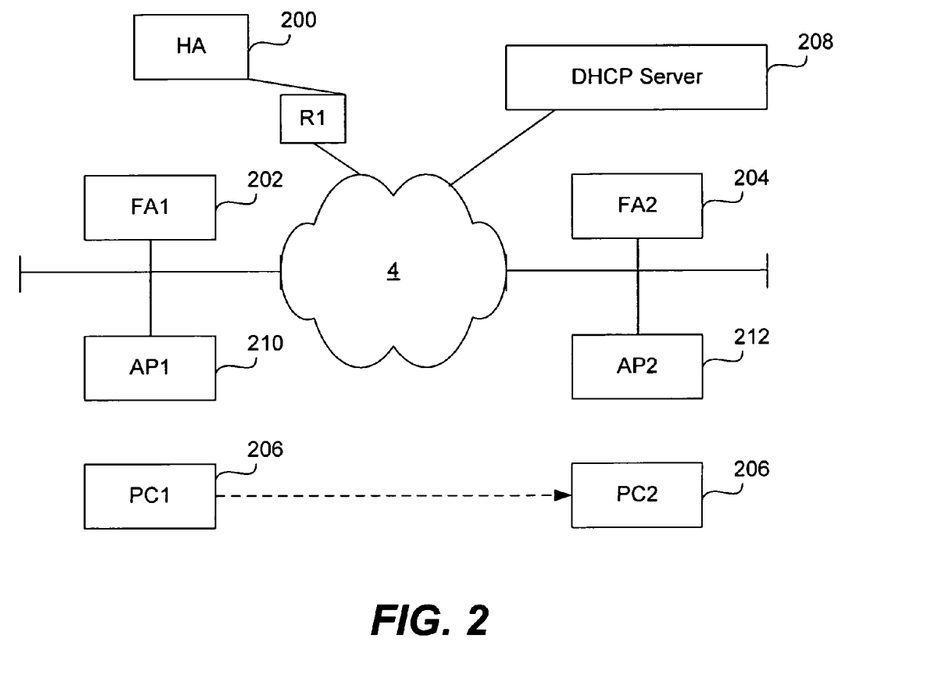
FIG. 2 is a diagram illustrating an exemplary system in which proxy Mobile IP may be implemented by one or more Access Points.

FIG. 2 is a block diagram illustrating a system in which the present invention may be implemented. In the following description, the present invention is implemented in a wireless network. However, although the present invention is described as being implemented in a wireless network, the present invention may also be implemented in a non-wireless network. As shown, a node 206 may wish to roam from its Home Agent 200 to a first Foreign Agent 202. Similarly, once attached to the first Foreign Agent 202, the node 206 may again wish to roam to a second Foreign Agent 204. Although the node 206 may have an assigned IP address, when the node 206 roams, it is preferable for the node to maintain this assigned IP address. For instance, although a DHCP server 208 typically dynamically assigns a new IP address to a node when its location within a network has changed, it is preferable to maintain the IP address originally assigned to the node by the DHCP server 208.

In a wireless network, Access Points 210 and 212 are coupled to the Foreign Agents 202 and 204. By way of example, in a wireless network, the Access Points 210 and 212 may have an antenna and receiver for receiving packets. As yet another example, the Access Points 210 and 212 may designate connection points in a non-wireless network. Typically, a mobile node implementing Mobile IP registers and de-registers with its Home Agent through the registration process. However, during proxy registration, registration is initiated by another network device such as an Access Point on behalf of the node. Similarly, de-registration may be initiated by the Access Point on behalf of the roaming node. For instance, node 206 that has roamed to the first Foreign Agent 202 is registered with the node's Home Agent 200 when the first Access Point 206 composes and sends a registration request packet via the first Foreign Agent 202. Thus, the first Foreign Agent's visitor table and the Home Agent's mobility binding table are updated to indicate that the node has roamed to the first Foreign Agent 202. When the node 206 roams to the second Foreign Agent 204, the node 206 is de-registered (e.g., by one of the Access Points 210, 212, either of the Foreign Agents 202, 204 or the Home Agent 200). In other words, the first Foreign Agent 202 updates its visitor table to reflect the movement of the node 206. Similarly, the Home Agent's mobility binding table is updated to reflect the movement of the node 206 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent. Alternatively, the visitor table may be maintained and updated by the Access Point.

FIG. 3 is a process flow diagram illustrating a method of supporting mobility in a client implementing DHCP in accordance with one embodiment of the invention. One message the client may transmit is a directed unicast DHCP request. When the client sends a directed DHCP request at 302, the client may or may not receive a DHCP response, depending upon the type of client. There are two types of clients. A type A client makes their IP address available to an Access Point, while a type B client does not make their IP address available to an Access Point. Upon identifying the type of client at 304, we can see that the type A client 306 receives a DHCP response at 308. For instance, the DHCP response may be received via a proxy Mobile IP tunnel via the Access Point if proxy Mobile IP is implemented. The client need not implement any further detection mechanisms and the process ends at 310. A type B client 312 does not receive a DHCP response at 314. As a result, a client may implement another detection mechanism via another message.

Another message the client may transmit is an ARP request to its default gateway at 316. The Access Point then sends an ARP reply to the client including a source MAC address equal to the MAC address of the Access Point. If the client receives the ARP reply at 320, the process ends at 310. Alternatively, the client may send a PING message (ECHO request) including a source IP address equal to the client's IP address (e.g., home address) to its default gateway at 322. The Access Point determines whether proxy Mobile IP will respond to the PING message at 324. In some instances, the Access Point may choose to respond to the PING message when it has ascertained that proxy Mobile IP is enabled (e.g., when proxy Mobile IP registration has been completed). An exemplary method of determining whether proxy Mobile IP will respond to the PING message will be described in further detail below with reference to FIG. 5. If it is determined that proxy Mobile IP should respond to the PING message, the Access Point sends a response to the PING via an ICMP ECHO reply including a source IP address equal to the IP address of the default gateway (e.g., Home Agent) and performs proxy Mobile IP registration on behalf of the client at 326. If the client receives the PING response at 328, the client need not transmit another detection message and the process ends at 330.

Another detection message the client may transmit is a broadcast DHCP request including a source IP address equal to the client's home address at 332. The Foreign Agent may be configured to identify broadcast DHCP requests. Thus, when the Foreign Agent receives the DHCP request, it tunnels a unicast DHCP request to the Home Agent at 334. The Home Agent maps the DHCP request to the interface (which is associated with client's home address) of the Home Agent, which may be referred to as a DHCP Relay Agent (or gateway), on which the DHCP request was received to obtain its gateway interface address (giaddr) at 336. The Home Agent provides the DHCP Relay Agent interface's IP address in the 'giaddr' field of the unicast DHCP request and sends the unicast DHCP request to a DHCP server at 338. The DHCP server sends a DHCP response to the DHCP Relay Agent at 340. Specifically, the DHCP Response is sent to the DHCP Relay Agent's IP address (aka 'giaddr') that has been specified in the DHCP request. The Home Agent tunnels the DHCP response to the client via the Foreign Agent at 342. If the client receives the DHCP response at 344, the client need not send any further detection messages and the process ends at 346.

The client may also transmit a broadcast DHCP discover message at 348. Proxy Mobile IP may abort at 350 and the client will obtain a new IP address at 350. Alternatively, a DHCP acknowledgement (DHCP ACK) message will be transmitted to the client at 352, as will be described in further detail below with reference to FIG. 4.

FIG. 4 is a process flow diagram illustrating a method of providing a response to a DHCP discover message as shown at block 352 of FIG. 3. When the client transmits a DHCP discover message, the Foreign Agent tunnels the DHCP discover message to the Home Agent at 402. The Home Agent maps the DHCP discover message to the interface (associated with the client's home address) on which the DHCP discover message was received to obtain a DHCP Relay Agent IP address at 404. The Home Agent provides the DHCP Relay Agent IP address in the 'giaddr' field of the DHCP discover message and sends the DHCP discover message to the DHCP server at 406. The DHCP server sends a DHCP offer to the DHCP Relay Agent in response to the DHCP discover at 410. The Home Agent tunnels the DHCP offer to the Foreign Agent at 412. The Foreign Agent further tunnels the DHCP offer to the client at 414.

When the client receives the DHCP offer, it sends a DHCP request at 416. The Foreign Agent tunnels the DHCP request to the Home Agent at 418. When the Home Agent receives the DHCP request, it maps the DHCP request to an input interface (e.g., physical Ethernet interface) on which the DHCP request was received to obtain the DHCP Relay Agent IP address at 420. The Home Agent provides the DHCP Relay Agent IP address in a 'giaddr' field of the DHCP request and sends the DHCP request to a DHCP server at 422. In response, the DHCP server sends a DHCP ACK message to the DHCP Relay Agent at 426. The Home Agent tunnels the DHCP ACK message to the Foreign Agent at 428, which tunnels the DHCP ACK message to the client at 430.

FIG. 5 is a process flow diagram illustrating a method of determining whether proxy Mobile IP will respond to the ping request with one embodiment of the invention. More specifically, proxy Mobile IP may choose to respond to the ping request when proxy Mobile IP is enabled. Various conditions may be used to ascertain whether proxy Mobile IP is enabled, as well as to ascertain whether a response is appropriate. As shown at step 502, the Access point receives a PING message from the client. The Access Point obtains the source MAC address from the PING message at 504 in addition to the destination IP address at 506. In accordance with one embodiment in which a media sense PING is transmitted, the value of the Time-To-Live (TTL) field is also obtained at 508 to determine the number of hops the client is away from the Access Point. The Access Point determines at 510 whether the source MAC address is a Node's MAC address and the destination IP address is a Home Agent IP address. If both of these conditions are true (and in some circumstances, the TTL field in the ping request was set to 1) at 512, then the ping request will be responded to by proxy Mobile IP on the Access Point at 514. However, if these conditions are not true, proxy Mobile IP will not respond to the ping request at 516.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Home Agent, Access Point) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 6:
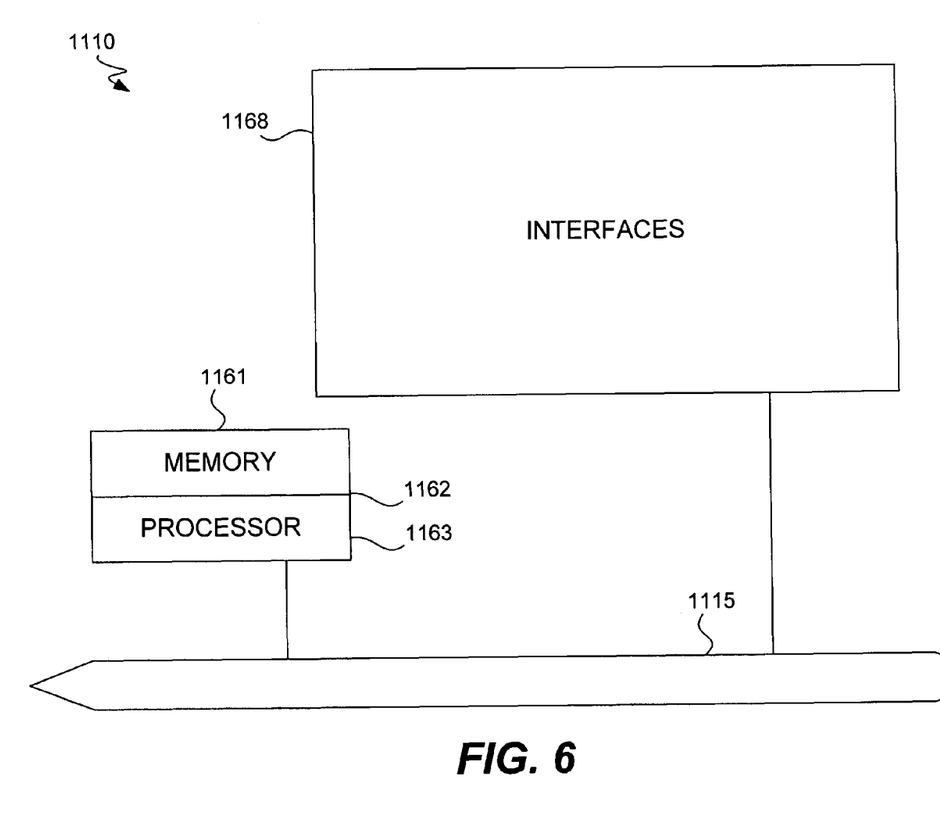
FIG. 6 is a diagrammatic representation of a router in which embodiments of the present invention may be implemented.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4, the present invention may be used with other versions of IP. Therefore, the described embodiments should be taken as illustrative and not restrictive, and the invention should not be limited to the details given herein but should be defined by the following claims and their full scope of equivalents.

What is claimed is:

1. In a network device, a method of preventing a client from being assigned a new IP address, comprising:

receiving a detection message by the network device from the client, wherein the detection message is an ARP;

transmitting a response by the network device to the client, wherein the response indicates that the client is on a home network of the client regardless of whether the client is on the home network, wherein the response is an ARP reply;

receiving a second detection message by the network device from the client, wherein the second detection message is an ICMP PING request;

transmitting a second response by the network device to the client, wherein the second response indicates that the client is on the home network of the client regardless of whether the client is on the home network, wherein the second response is an ICMP PING reply; and determining by the network device whether proxy Mobile IP is enabled;

wherein transmitting the second response by the network device to the client is performed when it is determined that proxy Mobile IP is enabled, wherein the network device includes a processor and a memory.

2. In a network device, a method of preventing a client from being assigned a new IP address, comprising:

receiving by the network device a detection message from the client, wherein the detection message is not a registration request;

transmitting by the network device a response to the client, the response being transmitted in response to the detection message, wherein the response indicates to the client that the client is on a home network of the client regardless of whether the client is on the home network without assigning an IP address to the client, wherein the detection message is an ICMP PING request and the response is an ICMP PING reply; and determining by the network device whether proxy Mobile IP is enabled;

wherein transmitting by the network device a response to the client is performed when it is determined that proxy Mobile IP is enabled, the network device implementing DHCP and including a processor and a memory;

wherein when the client roams, a media sense feature of the client does not detect a state change as a result of the response, thereby preventing the media sense feature from activating the DHCP to obtain a new IP address that will be used a home address of the client in a Mobile IP session established in association with the client.

3. The method as recited in claim 2, wherein a Mobile IP session has previously been established in association with the client.

4. In a network device having a processor and a memory, a method of preventing a client from being assigned a new IP address, comprising:

receiving by the network device a detection message from the client;

transmitting by the network device a response to the client, wherein the response indicates to the client that the client is on a home network of the client regardless of whether the client is on the home network; and determining by the network device whether proxy Mobile IP is enabled;

wherein transmitting by the network device a response to the client is performed when it is determined that proxy Mobile IP is enabled;

wherein determining whether proxy Mobile IP is enabled includes:

obtaining a source MAC address from the detection message;

obtaining a destination IP address from the detection message;

determining whether the source MAC address is on a foreign network; and determining whether the destination IP address is an IP address of a Home Agent of the client and whether the IP address of the Home Agent of the client is on a foreign network wherein the client implements DHCP, wherein when the client roams, a media sense feature of the client does not detect a state change as a result of the response, thereby preventing the media sense feature from activating the DHCP in order to obtain a new IP address that will be used as a home address of the client in a Mobile IP session established in association with the client.

5. The method as recited in claim 4, wherein a Mobile IP session has previously been established in association with the client.

6. In a network device having a processor and a memory, a method of preventing a client from being assigned a new IP address, comprising:

receiving by the network device a detection message from the client;

transmitting by the network device a response to the client, wherein the response indicates that the client is on a home network of the client regardless of whether the client is on the home network;

determining by the network device whether proxy Mobile IP is enabled;

wherein transmitting by the network device a response to the client is performed when it is determined that proxy Mobile IP is enabled;

wherein determining by the network device whether proxy Mobile IP is enabled includes:

obtaining a source MAC address from the detection message;

obtaining a destination IP address from the detection message;

determining whether the source MAC address is on a foreign network; and determining whether the destination IP address is an IP address of a Home Agent of the client and whether the IP address of the Home Agent of the client is on a foreign network;

obtaining a time to live from the detection message; and determining whether the time to live from the node is equal to 1.

7. In a network device, a method of preventing a client from being assigned a new IP address, comprising:

receiving a detection message by the network device from the client, wherein the detection message is not a registration request;

transmitting a response by the network device to the client, the response being transmitted in response to the detection message, wherein the response indicates that the client is on a home network of the client regardless of whether the client is on the home network without assigning an IP address to the client, wherein the detection message is an ARP and the response is an ARP reply;

receiving a second detection message by the network device from the client;

transmitting a second response by the network device to the client, wherein the second response indicates that the client is on the home network of the client regardless of whether the client is on the home network; and determining by the network device whether proxy Mobile IP is enabled;

wherein transmitting the second response by the network device to the client is performed when it is determined that proxy Mobile IP is enabled, wherein the network device includes a processor and a memory;
wherein the client implements DHCP, wherein when the client roams, a media sense feature of the client does not detect a state change as a result of the second response, thereby preventing the media sense feature from activating the DHCP in order to obtain a new IP address.

8. The method as recited in claim 7, wherein the network device is an Access Point.

9. The method as recited in claim 7, wherein the client is in a foreign network.

10. In a network device having a processor and a memory, a method of preventing a client from being assigned a new IP address, comprising:
receiving by the network device a DHCP discover from the client;
identifying by the network device a physical interface of the network device on which the DHCP discover was received;
providing by the network device a MAC address associated with the physical interface as a source MAC address in the DHCP discover;
transmitting by the network device the DHCP discover to a DHCP server;
receiving by the network device a DHCP offer from the DHCP server;
transmitting by the network device the DHCP offer to the client;
receiving by the network device a DHCP request from the client;
identifying by the network device a physical interface of the network device on which the DHCP request was received;
providing by the network device a MAC address associated with the physical interface as a source MAC address in the DHCP request; and
transmitting by the network device the DHCP request to a DHCP server, wherein the DHCP sever does not assign an IP address to the client, lease an IP address to the client, or otherwise extend a lease of an IP address that has been assigned to the client.

11. The method as recited in claim 10, wherein the network device is a Home Agent.

12. The method as recited in claim 11, wherein the client is on a foreign network.

13. The method as recited in claim 10, wherein the network device is a Home Agent.

14. The method as recited in claim 10, further comprising:
receiving a DHCP ACK from the DHCP server; and
transmitting the DHCP ACK to the client.

15. In a network device, a method of preventing a client from being assigned a new IP address, comprising:
receiving a detection message by the network device from the client, wherein the detection message is not a registration request;
transmitting a response by the network device to the client, the response being transmitted in response to the detection message, wherein the response indicates that the client is on a home network of the client regardless of whether the client is on the home network without assigning an IP address to the client, wherein the detection message is an ARP and the response is an ARP reply;
receiving a second detection message by the network device from the client;
transmitting a second response by the network device to the client, wherein the second response indicates that the client is on the home network of the client regardless of whether the client is on the home network; and
determining by the network device whether proxy Mobile IP is enabled;
wherein transmitting the second response by the network device to the client is performed when it is determined that proxy Mobile IP is enabled, wherein the network device includes a processor and a memory;
wherein a Mobile IP session has previously been established in association with the client.

16. A network device operable to prevent a client from being assigned a new IP address, comprising:
a processor; and
a memory, at least one of the processor or the memory are further adapted for:
receiving a detection message from the client, wherein the detection message is not a registration request;
transmitting a response to the client, the response being transmitted in response to the detection message, wherein the response indicates to the client that the client is on a home network of the client regardless of whether the client is on the home network without assigning an IP address to the client, leasing an IP address to the client, or otherwise extending a lease of an IP address that has been assigned to the client; and
determining whether proxy Mobile IP is enabled;
wherein transmitting a response to the client is performed when it is determined that proxy Mobile IP is enabled;
wherein the client implements DHCP, wherein when the client roams, a media sense feature of the client does not detect a state change as a result of the response, thereby preventing the media sense feature from activating the DHCP in order to obtain a new IP address that will be used as a home address of the client;
wherein a Mobile IP session has previously been established in association with the client, wherein the response prevents the Mobile IP session from being disrupted as a result of the assignment of a new IP address for use as the home address of the client.

17. A network device, comprising:
a processor; and
a memory, at least one of the processor or the memory are further adapted for:
sending a detection message, wherein the detection message is not a registration request; and
receiving a response, wherein the response indicates to the network device that the network device is on a home network of the network device regardless of whether the network device is on the home network without assigning an IP address to the client, leasing an IP address to the client, or otherwise extending a lease of an IP address that has been assigned to the client; and
determining whether proxy Mobile IP is enabled;
wherein transmitting a response to the client is performed when it is determined that proxy Mobile IP is enabled;
wherein the network device implements DHCP, wherein when the network device roams, a media sense feature of the network device does not detect a state change as a result of the response, thereby preventing the media sense feature from activating the DHCP in order to obtain a new IP address that will be used as a home address of the client;
wherein a Mobile IP session has previously been established in association with the network device, wherein preventing the media sense feature from activating the DHCP prevents the Mobile IP session from being disrupted.

18. A network device operable to prevent a client from being assigned a new IP address, comprising:
   a processor; and
   a memory, at least one of the processor or the memory are further adapted for:
      receiving a detection message from the client, wherein the detection message is not a registration request; and
      transmitting a response to the client, the response being transmitted in response to the detection message, wherein the response indicates to the client that the client is on a home network of the client regardless of whether the client is on the home network without assigning an IP address to the client or otherwise leasing or extending a lease of an IP address previously assigned to the client;
      receiving a second detection message from the client; and
      transmitting a second response to the client, wherein the second response indicates to the client that the client is on the home network of the client regardless of whether the client is on the home network of the client without assigning an IP address to the client or otherwise leasing or extending a lease of an IP address previously assigned to the client;
      wherein the client implements DHCP, wherein when the client roams, a media sense feature of the client does not detect a state change as a result of the second response, thereby preventing the media sense feature from activating the DHCP in order to obtain a new IP address that will be used as a home address, thereby preventing a Mobile IP session established in association with the client from being disrupted.

19. The network device as recited in claim 18, wherein the detection message is an ARP and the response is an ARP reply.

20. The network device as recited in claim 19, at least one of the processor or the memory being further adapted for:
   determining whether proxy Mobile IP is enabled;
   wherein transmitting the second response to the client is performed when it is determined that proxy Mobile IP is enabled.

21. The network device as recited in claim 18, at least one of the processor or the memory being further adapted for:
   determining whether proxy Mobile IP is enabled;
   wherein transmitting the second response to the client is performed when it is determined that proxy Mobile IP is enabled;
wherein the Mobile IP session has been established by the network device on behalf of the client.

22. A network device operable to prevent a client from being assigned a new IP address, comprising:
   a processor; and
   a memory, at least one of the processor or the memory are further adapted for:
      receiving a detection message from the client, wherein the detection message is an ARP;
      transmitting a response to the client, wherein the response indicates that the client is on a home network of the client regardless of whether the client is on the home network, wherein the response is an ARP reply;
      receiving a second detection message from the client, wherein the second detection message is an ICMP PING request;
      transmitting a second response to the client, wherein the second response indicates that the client is on the home network of the client regardless of whether the client is on the home network, wherein the second response is an ICMP PING reply; and
      determining whether proxy Mobile IP is enabled;
      wherein transmitting the second response to the client is performed when it is determined that proxy Mobile IP is enabled.

23. A network device operable to prevent a client from being assigned a new IP address, comprising:
   a processor; and
   a memory, at least one of the processor or the memory are further adapted for:
      receiving a detection message from the client, wherein the detection message is not a registration request;
      transmitting a response to the client, the response being transmitted in response to the detection message, wherein the response indicates to the client that the client is on a home network of the client regardless of whether the client is on the home network without assigning an IP address to the client, leasing an IP address to the client, or otherwise extending a lease of an IP address of the client, wherein the detection message is an ICMP PING request and the response is an ICMP PING reply; and
      determining whether proxy Mobile IP is enabled;
      wherein transmitting a response to the client is performed when it is determined that proxy Mobile IP is enabled;
      wherein the client implements DHCP, wherein when the client roams, the response prevents a media sense feature of the client from detecting a state change, thereby preventing the media sense feature from activating the DHCP in order to obtain a new IP address that will be used as a home address of the client, thereby preventing a Mobile IP session established in association with the client from being interrupted.

24. A network device operable to prevent a client from being assigned a new IP address, comprising:
   a processor; and
   a memory, at least one of the processor or the memory are further adapted for:
      receiving a DHCP discover from the client;
      identifying a physical interface of the network device on which the DHCP discover was received;
      providing a MAC address associated with the physical interface as a source MAC address in the DHCP discover;
      transmitting the DHCP discover to a DHCP server;
      receiving a DHCP offer from the DHCP server;
      transmitting the DHCP offer to the client;
      receiving a DHCP request from the client;
      identifying a physical interface of the network device on which the DHCP request was received;
      providing a MAC address associated with the physical interface as a source MAC address in the DHCP request; and
      transmitting the DHCP request to a DHCP server, wherein the DHCP server does not assign an IP address to the client, lease an IP address to the client, or otherwise extend a lease of an IP address that has been assigned to the client.

* * * * *